United States Patent
Wang et al.

(10) Patent No.: US 12,386,234 B1
(45) Date of Patent: Aug. 12, 2025

(54) SWITCHING METHOD FOR SWITCHING A LIQUID CRYSTAL POLARIZING GRATING BETWEEN TRNSMISSION DIFRACTION AND REFLECTION DIFRACTION

(71) Applicant: NATIONAL SUN YAT-SEN UNIVERSITY, Kaohsiung (TW)

(72) Inventors: Chun-Ta Wang, Kaohsiung (TW); Yu-Chieh Li, Kaohsiung (TW); Yi-Te Chuang, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 18/804,167

(22) Filed: Aug. 14, 2024

(30) Foreign Application Priority Data

Jun. 11, 2024 (TW) ................................ 113121499

(51) Int. Cl.
*G02F 1/1337* (2006.01)
*G02B 5/30* (2006.01)
*G02F 1/29* (2006.01)

(52) U.S. Cl.
CPC ................................... *G02F 1/292* (2013.01)

(58) Field of Classification Search
CPC .... G02F 1/13712; G02F 1/13439; G02F 1/13; G02F 1/13718; G02F 2201/343; G02F 2201/302; G02F 2201/30; G02F 2201/305
See application file for complete search history.

(56) References Cited

U.S. PATENT DOCUMENTS

| | | | |
|---|---|---|---|
| 2019/0086698 A1* | 3/2019 | Mizusaki | G02F 1/133528 |
| 2020/0257143 A1* | 8/2020 | Murata | G02F 1/134309 |
| 2020/0271842 A1* | 8/2020 | Yoshida | G02F 1/133553 |
| 2023/0258849 A1* | 8/2023 | Oka | G02B 5/18 349/175 |
| 2024/0142086 A1* | 5/2024 | Koito | F21V 9/20 |

OTHER PUBLICATIONS

Hung et al. Direction switching and beam steering of cholesteric liquid, Appl. phys. letter 100 (Year: 2012).*
Komanduri, High efficiency reflective liquid crystal polarization gratings, Appl. Phys letter 95 (Year: 2009).*

* cited by examiner

*Primary Examiner* — Tracie Y Green
(74) *Attorney, Agent, or Firm* — WPAT, PC (57) ABSTRACT

A switching method for a liquid crystal polarizing grating is provided to solve the problems of low diffraction efficiency and incapability in switching between reflection and transmission modes of a conventional polarizing grating. The switching method includes five steps. In an initial step, no voltage is applied, and liquid crystal molecules of cholesteric liquid crystal layer of the liquid crystal polarizing grating are arranged in a planar structure. In a first step, a first alternating current voltage with a first frequency is applied. In a second step, a second alternating current voltage with a second frequency is applied. In a third step, a third alternating current voltage with a third frequency is applied. In a fourth step, a fourth alternating current voltage with a fourth frequency is applied, and the liquid crystal molecules are arranged in a uniform lying helix structure.

8 Claims, 10 Drawing Sheets

SWITCHING METHOD FOR SWITCHING A LIQUID CRYSTAL POLARIZING GRATING BETWEEN TRNSMISSION DIFRACTION AND REFLECTION DIFRACTION

CROSS REFERENCE TO RELATED APPLICATION

The application claims the benefit of Taiwan application serial No. 113121499, filed on Jun. 11, 2024, and the entire contents of which are incorporated herein by reference.

BACKGROUND OF THE INVENTION

1. Field of the Invention

The present invention relates to an optical element controlling method and, more particularly, to a switching method for quickly switching a liquid crystal polarizing grating between transmission diffraction and reflection diffraction.

2. Description of the Related Art

A cholesteric liquid crystal is a material having a periodically arranged helical structure, which has multi-stable characteristics and may be switched between different stable states through application of specific electric fields. When helical axes of cholesterol liquid crystals are uniformly arranged perpendicular to a substrate, a planar structure is formed, and a reflection characteristic varies with a magnitude of a period. A uniform lying helix (ULH) state is also a stable state of cholesteric liquid crystals, in which optical axes of the cholesteric liquid crystals are unidirectional and parallel to the substrate. The helix pitch is close to a wavelength of visible light, and the cholesteric liquid crystals have such characteristics as a fast dielectric effect and periodic distribution of refractive indexes. Thus, the cholesteric liquid crystal can be used to form a grating.

However, the ULH state is not a stable state under normal condition and requires continuous application of electric field to maintain a complete structure thereof. In addition, switching of an existing polarizing grating between reflection (corresponding to a planar structure and a planar state) and transmission (corresponding to a ULH state) types is not precise enough.

In view of this, it is necessary to improve the known switching method for a liquid crystal polarizing grating.

SUMMARY OF THE INVENTION

To solve the above problems, it is an objective of the present invention to provide a switching method for a liquid crystal polarizing grating, which can achieve switching between transmission diffraction and reflection diffraction.

It is another objective of the present invention to provide a switching method for a liquid crystal polarizing grating, which can improve a diffraction efficiency of light when passing through liquid crystal molecules.

It is yet another objective of the present invention to provide a switching method for a liquid crystal polarizing grating, which requires less space in an optical system.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

A switching method for a liquid crystal polarizing grating according to the present invention is provided to switch the liquid crystal polarizing grating including two substrates, two alignment films, and a cholesteric liquid crystal layer. The two alignment films are respectively located on opposite inner surfaces of the two substrates. The cholesteric liquid crystal layer is located between the two alignment films. Alignment directions of the alignment films are periodically arranged based on a grating period. A voltage is applied to the liquid crystal polarizing grating to form an alternating current electric field between the two substrates and act on the cholesteric liquid crystal layer. The switching method includes five steps. In an initial step, no voltage is applied to the liquid crystal polarizing grating, and liquid crystal molecules of the cholesteric liquid crystal layer are arranged in a planar structure. In a first step, a first alternating current voltage is applied to the liquid crystal polarizing grating, with the first alternating current voltage having a first frequency. In a second step, a second alternating current voltage is applied to the liquid crystal polarizing grating, with the second alternating current voltage having a second frequency. In a third step, a third alternating current voltage is applied to the liquid crystal polarizing grating, with the third alternating current voltage having a third frequency. In a fourth step, a fourth alternating current voltage is applied to the liquid crystal polarizing grating, with the fourth alternating current voltage having a fourth frequency, and with the liquid crystal molecules of the cholesteric liquid crystal layer arranged in a uniform lying helix structure. The first alternating current voltage is greater than the third alternating current voltage and the fourth alternating current voltage. The second alternating current voltage is greater than the third alternating current voltage and the fourth alternating current voltage. The first frequency is greater than the second frequency and the third frequency. The fourth frequency is greater than the second frequency and the third frequency.

According to the switching method for the liquid crystal polarizing grating of the present invention, the liquid crystal polarizing grating incorporates the positive cholesteric liquid crystals and the alignment films with periodic alignment directions. Through applying specific voltages and frequency changes in the four stages, the liquid crystal molecules can be arranged in a complete and stable ULH structure through the electrohydrodynamic effect (EDH effect). In addition, the liquid crystal molecules can be switchable between the planar structure and the ULH structure. The planar structure and the ULH structure may respectively correspond to a reflective polarizing grating and a transmissive polarizing grating. In this way, switching between two optical operating modes can be achieved through a single optical element, thereby improving operational flexibility, saving space in an optical system, and improving the diffraction efficiency.

In an example, the first alternating current voltage is between 30 V and 50 V, and the first frequency is between 1 kHz and 30 kHz. Thus, when the voltage with a high magnitude and a high frequency is applied, the liquid crystal molecules can form a homeotropic alignment, thereby avoiding polarization rotation of light passing through the liquid crystals.

In an example, the second alternating current voltage is between 30 V and 50 V, and the second frequency is between 10 Hz and 60 Hz. Thus, when the voltage with a high magnitude and a low frequency is applied, an EDH effect can induce a perturbation to disturb the liquid crystal molecules to present a chaotic arrangement.

In an example, the third alternating current voltage is between 8 V and 12 V, and the third frequency is between 10 Hz and 60 Hz. Thus, when the voltage with a low magnitude and a low frequency is applied, the liquid crystal molecules can gradually form the ULH structure, thereby adjusting the arrangement of the liquid crystal molecules.

In an example, the third alternating current voltage is between 8 V and 12 V, and the fourth frequency is between 1 kHz and 30 kHz. Thus, when the voltage with a low magnitude and a high frequency is applied, the liquid crystal molecules can form a periodically arranged ULH structure, thereby improving a diffraction efficiency of transmitting light.

In an example, in the fourth step in which the liquid crystal molecules are arranged in the uniform lying helix structure, the first alternating current voltage is applied to the liquid crystal polarizing grating and then removed, and the liquid crystal molecules are returned to the planar structure as provided in the initial step. Thus, the cholesteric liquid crystal layer can return from the ULH structure to the planar structure, thereby switching between a transmissive diffraction mode and a reflective diffraction mode.

In an example, a wavelength of light reflected by the cholesteric liquid crystal layer is between 400 nm and 700 nm. Thus, the cholesteric liquid crystal layer can reflect visible light, thereby modulating the visible light.

In an example, the grating period is between 200 nm to 40 µm. Thus, the grating period may be used for calculating a light modulation result, thereby controlling diffracted light.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

In order to make the above and other objectives, features, and advantages of the present invention clearer and easier to understand, preferred embodiments of the present invention will be described hereinafter in connection with the accompanying drawings. Furthermore, the elements designated by the same reference numeral in various figures will be deemed as identical, and the description thereof will be omitted.

Figure 1:
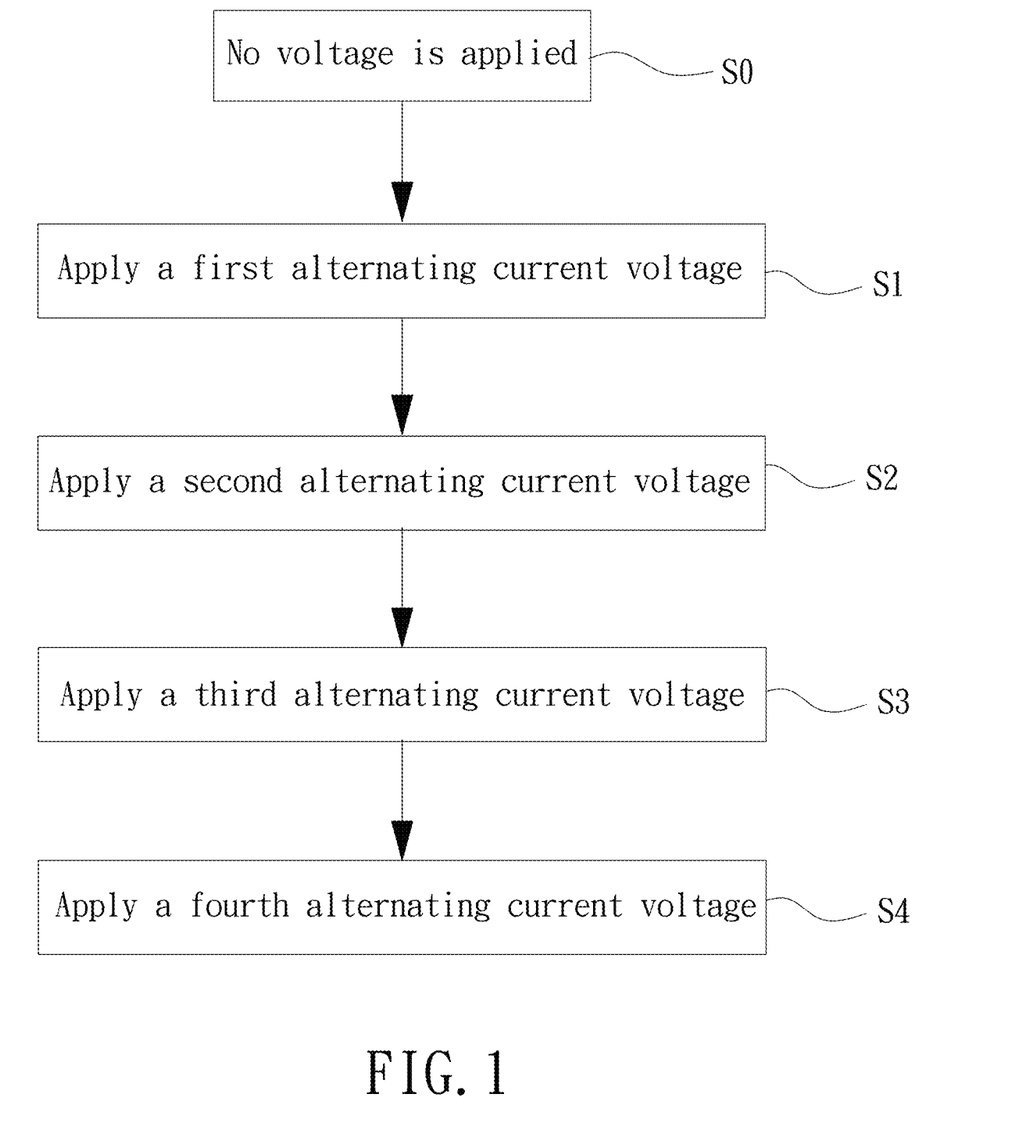
FIG. 1 is a flowchart according to a preferred embodiment of the present invention.

FIG. 1 shows a preferred embodiment of a switching method for a liquid crystal polarizing grating of the present invention. The switching method for the liquid crystal polarizing grating includes the following steps. In an initial step S0, no voltage is applied to the liquid crystal polarizing grating, so that liquid crystal molecules are arranged in a planar structure. In a first step S1, a first alternating current voltage is applied to the liquid crystal polarizing grating, where the first alternating current voltage has a first frequency. In a second step S2, a second alternating current voltage is applied to the liquid crystal polarizing grating, where the second alternating current voltage has a second frequency. In a third step S3, a third alternating current voltage is applied to the liquid crystal polarizing grating, where the third alternating current voltage has a third frequency. In a fourth step S4, a fourth alternating current voltage is applied to the liquid crystal polarizing grating, so that the liquid crystal molecules are arranged in a uniform lying helix (ULH) structure, where the fourth alternating current voltage has a fourth frequency.

Figure 2:
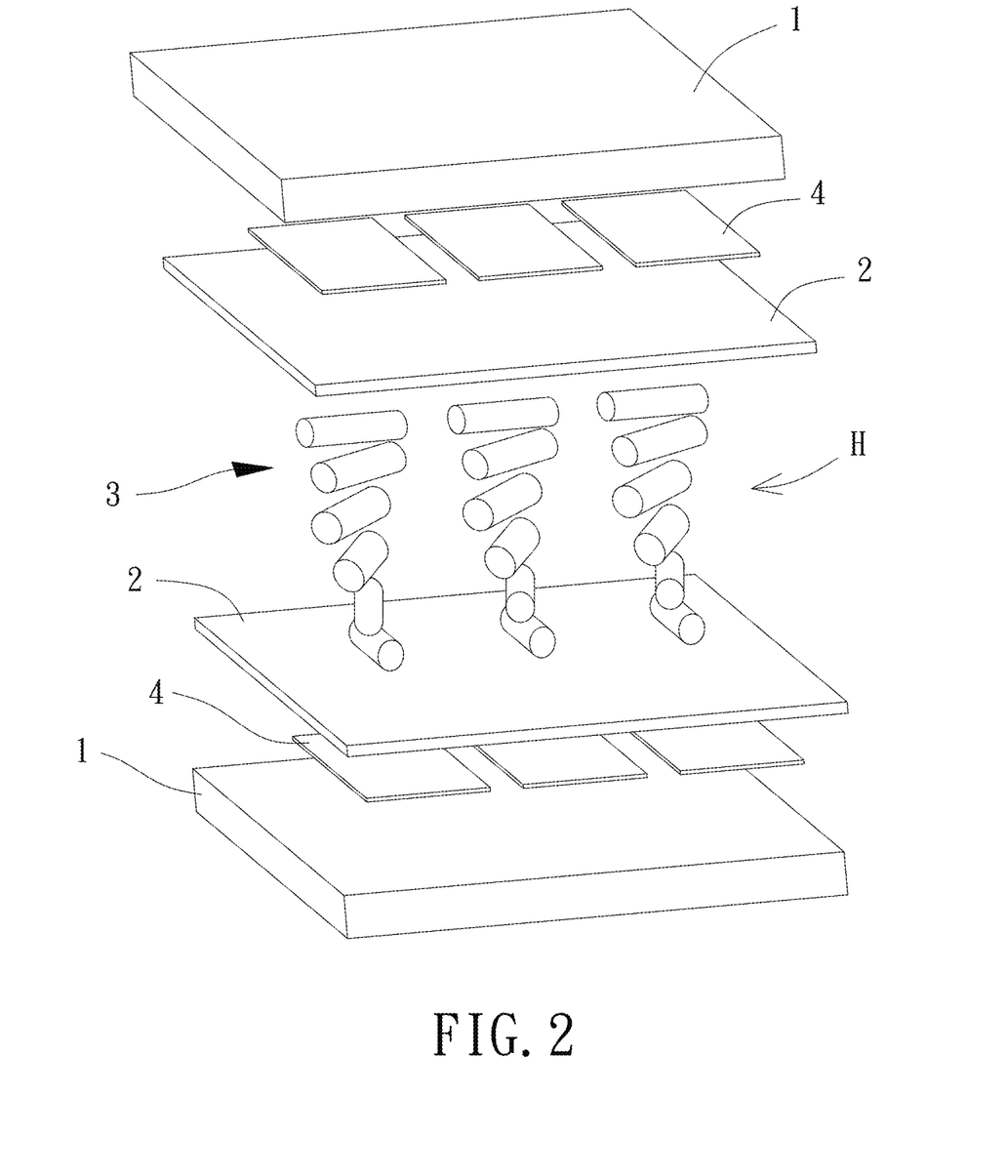
FIG. 2 is an exploded perspective view of the liquid crystal polarizing grating according to the present invention.

Referring to FIG. 2, the liquid crystal polarizing grating includes two substrates 1, two alignment films 2, and a cholesteric liquid crystal layer 3. The two substrates 1 are arranged opposite to each other. An interlayer space H is formed between the two substrates 1. The two alignment films 2 are respectively located on inner surfaces of the two substrates 1 facing the interlayer space H. The cholesteric liquid crystal layer 3 is located between the two alignment films 2. A voltage source (not shown) may apply an alternating current voltage to the two substrates 1 to form an alternating current electric field between the two substrates 1 and act on the cholesteric liquid crystal layer 3. The two substrates 1 may be transparent substrates, and are preferably made of conductive, transparent, and non-breathable materials. The two substrates 1 may be made of materials including but not limited to glass, acrylic, plastic, polyethylene terephthalate (PET), polycarbonate (PC), and polyimide (PI).

Figure 3:
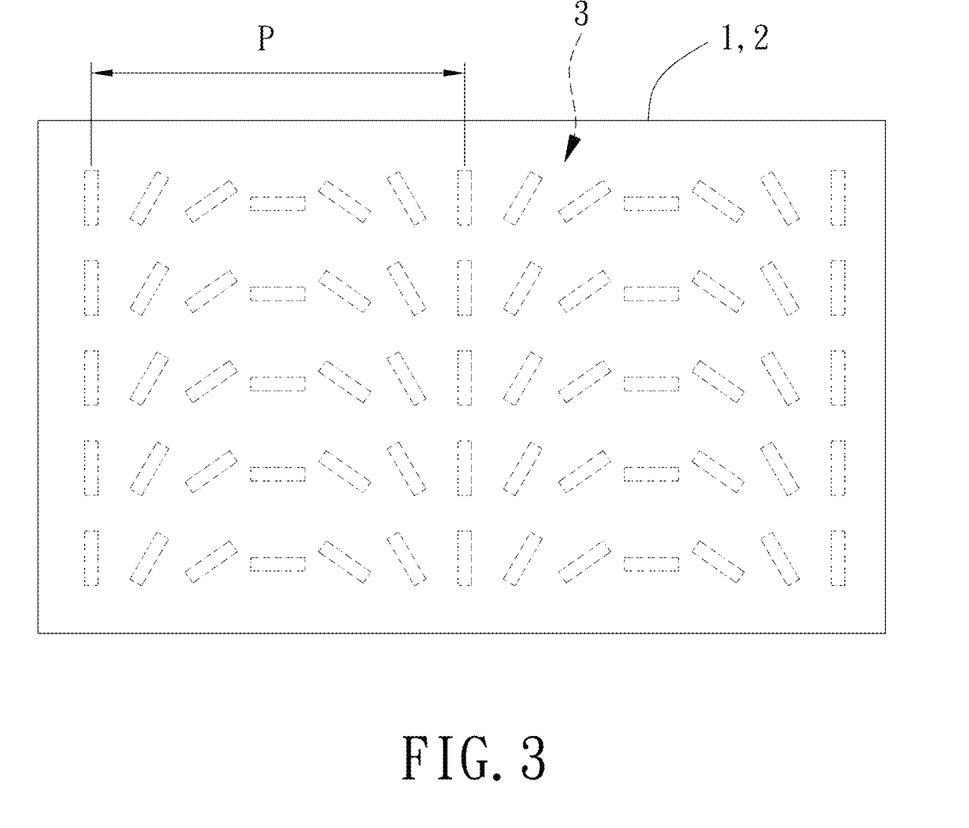
FIG. 3 is a front view of a structure of the liquid crystal polarizing grating according to the present invention.

Referring to FIG. 3, alignment directions of the alignment films 2 are periodically arranged. Specifically, an alignment plane of each alignment film 2 is divided into a plurality of rows parallel to each other. The alignment directions in a same row are the same, and the alignment directions in adjacent rows rotate relative to each other. The plurality of rows with the alignment directions rotated by 180 degrees defines a grating period P.

The cholesteric liquid crystal layer 3 includes positive nematic liquid crystals and chiral molecules. A reflection waveband formed after mixing the positive nematic liquid crystals and the chiral molecules is between 400 nanometers (nm) and 700 nm. For example, the reflection waveband is 400 nm, 450 nm, 500 nm, 550 nm, 600 nm, 650 nm, or 700 nm. Liquid crystal molecules of the cholesteric liquid crystal layer 3 adjacent to the alignment films 2 are arranged following the alignment direction of each alignment film 2. As shown in FIG. 3, the arrangement directions of a plurality of liquid crystal molecules in a same row are the same, and the arrangement directions in adjacent rows rotate relative to each other. In addition, since the arrangement directions of the liquid crystal molecules are polarizing directions through which light passes, a periodically arranged liquid crystal polarizing grating can be formed with the grating period P. In this embodiment, a thickness of the cholesteric liquid crystal layer 3 may be 4 micrometers ($\mu m$), and an alignment direction thereof may be formed through exposure orientation and/or groove orientation. The grating period P is between 200 nm and 40 $\mu m$. For example, the grating period is 1 $\mu m$, 4 $\mu m$, 5 $\mu m$, 10 $\mu m$, 15 $\mu m$, 20 $\mu m$, 25 $\mu m$, 30 $\mu m$, 35 $\mu m$, or 40 $\mu m$.

In addition, the liquid crystal polarizing grating may further include two conductive films 4. The two conductive films 4 are respectively located between the inner surfaces of the two substrates 1 facing the interlayer space H and the two alignment films 2. The two conductive films 4 are electrically connected to the voltage source and may switchably apply the alternating current electric field to the cholesteric liquid crystal layer 3. The two conductive films 4 may be made of transparent conductive metals including but not limited to indium tin oxide (ITO), nano silver wires, and nano metal particles.

Figure 4:
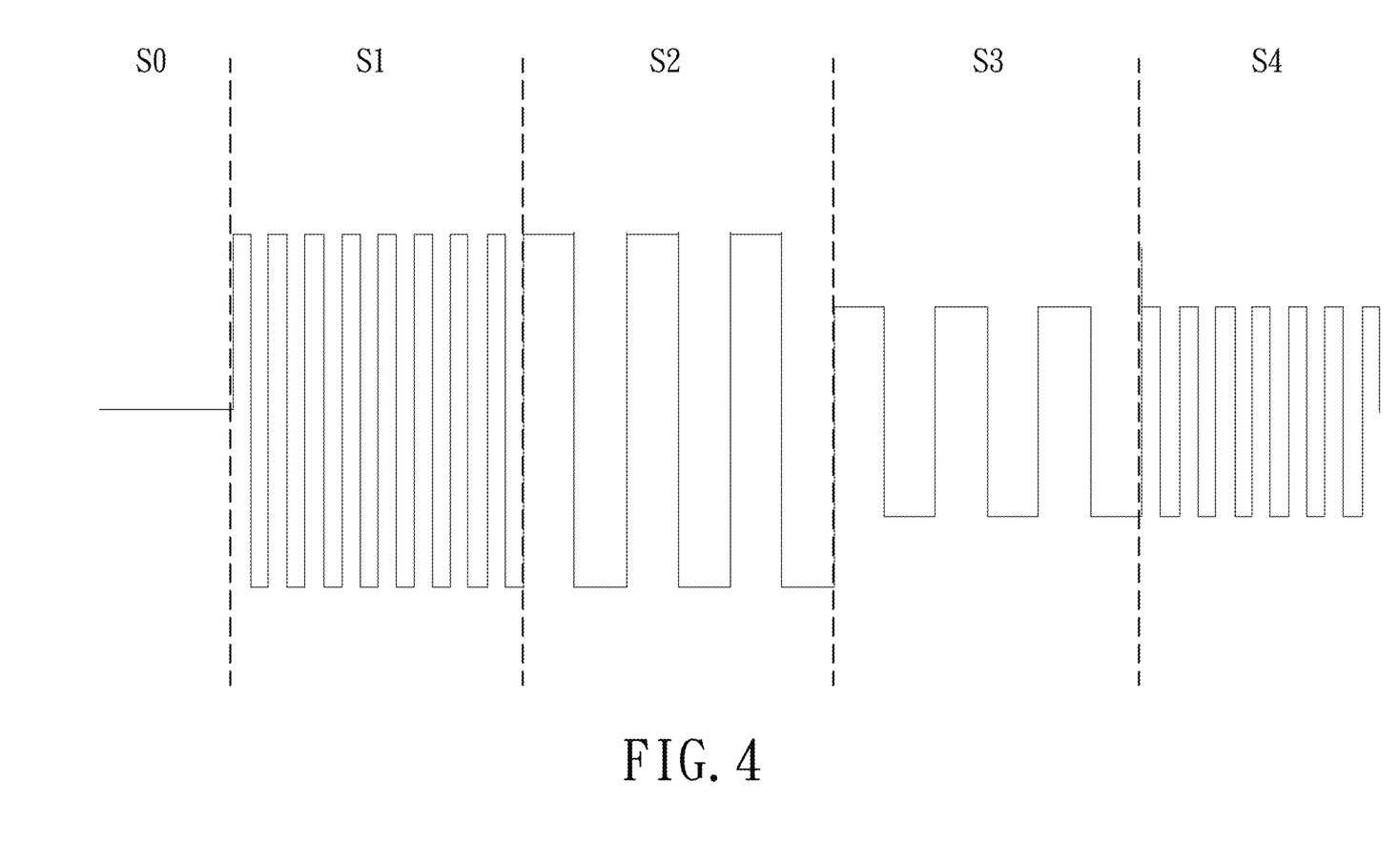
FIG. 4 is a timing diagram of changing an operating step of the liquid crystal polarizing grating through switching an alternating current voltage according to the present invention.
Figure 9:
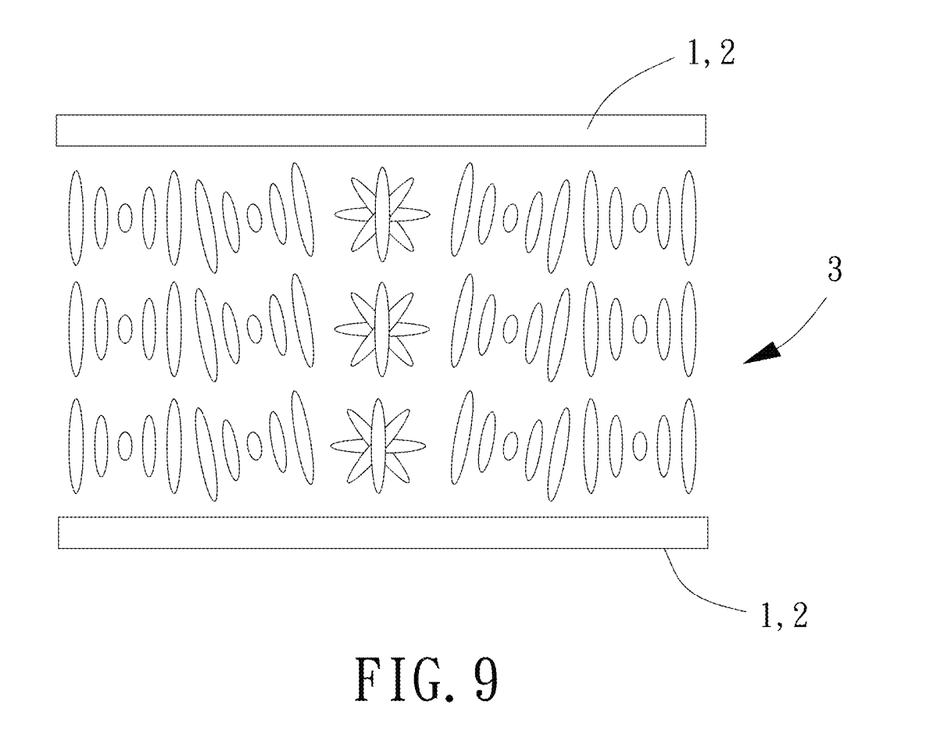
FIG. 9 is a diagram showing a ULH structure arrangement of liquid crystal molecules caused by applying the fourth alternating current voltage.

Referring to FIGS. 1, 4, and 9, in the switching method for the liquid crystal polarizing grating of the present invention, the liquid crystal polarizing grating is switched from the planar structure to the ULH structure by successively performing the initial step S0, the first step S1, the second step S2, the third step S3, and the fourth step S4. As shown in FIG. 4, the first alternating current voltage is greater than the third alternating current voltage and the fourth alternating current voltage, and the second alternating current voltage is greater than the third alternating current voltage and the fourth alternating current voltage. The first frequency is greater than the second frequency and the third frequency, and the fourth frequency is greater than the second frequency and the third frequency.

Figure 5:
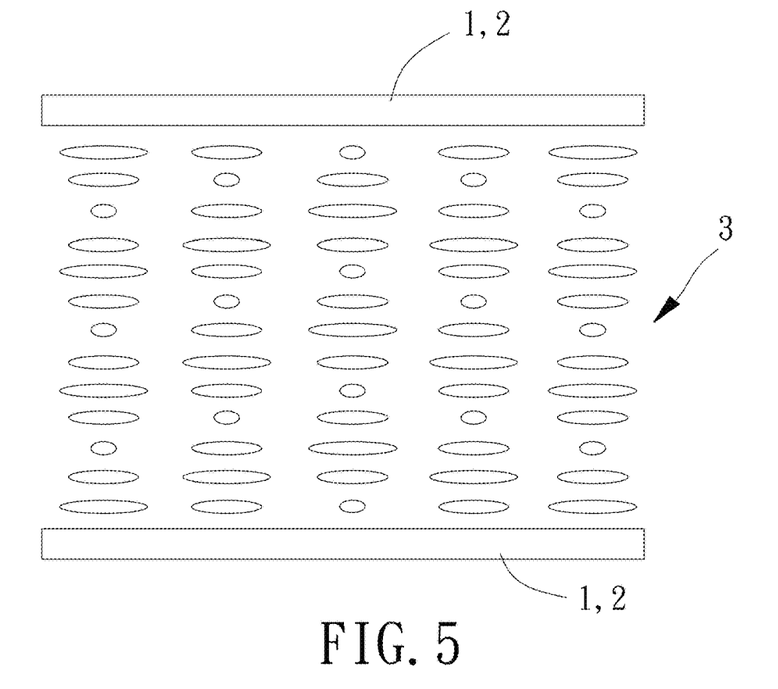
FIG. 5 is a diagram showing a planar structure arrangement of liquid crystal molecules before applying voltage.

In the initial step S0, no voltage is applied to the liquid crystal polarizing grating. As shown in FIG. 5, the liquid crystal molecules of the cholesteric liquid crystal layer 3 are arranged in the planar structure, and the liquid crystal molecules adjacent to the alignment films 2 are arranged following the alignment directions, forming a periodically arranged reflective polarizing grating having a function of reflecting light with a specific circularly polarized state.

Figure 6:
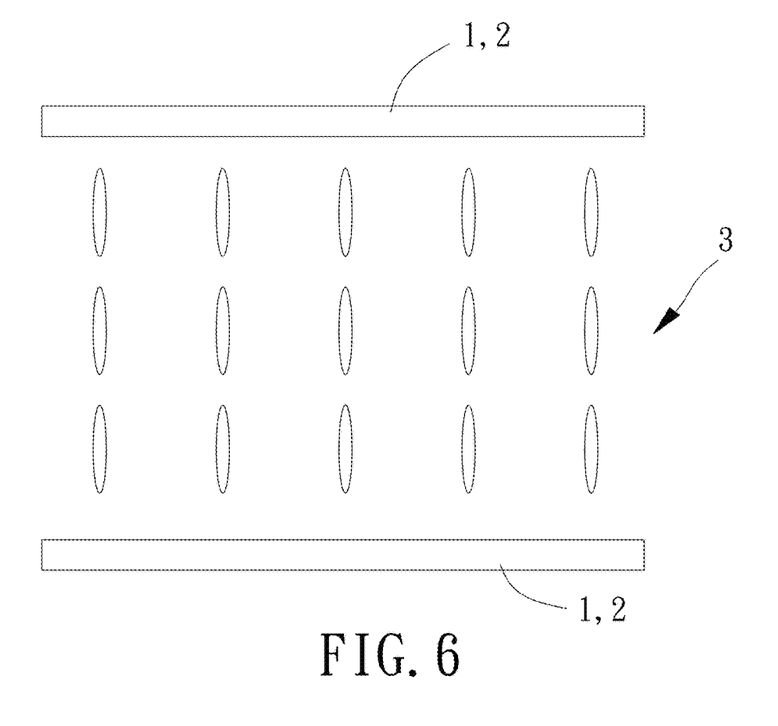
FIG. 6 is a diagram showing a homeotropic alignment arrangement of liquid crystal molecules caused by applying the first alternating current voltage.

In the first step S1, the first alternating current voltage with a high magnitude and a high frequency is applied to the liquid crystal polarizing grating. The first alternating current voltage is between 30 V and 50 V, and the first frequency is between 1 kilohertz (kHz) and 30 kHz. As shown in FIG. 6, the liquid crystal molecules are arranged in a homeotropic alignment. In other words, the liquid crystal molecules are perpendicular to the two substrates 1, so that polarized light passes through the cholesteric liquid crystal layer 3 without a polarization change.

Figure 7:
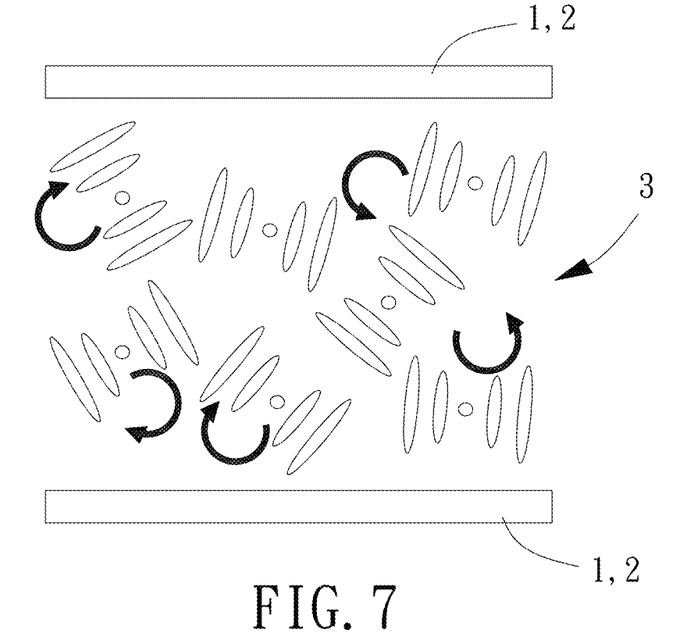
FIG. 7 is a diagram showing a chaotic arrangement of liquid crystal molecules due to perturbation caused by applying the second alternating current voltage.

In the second step S2, the second alternating current voltage with a high magnitude and a low frequency is applied to the liquid crystal polarizing grating. The second alternating current voltage is between 30 V and 50 V, and the second frequency is between 10 Hz and 60 Hz. As shown in FIG. 7, an electrohydrodynamics effect (EDH effect) induces a perturbation on the liquid crystal molecules, so that the liquid crystal molecules are in an irregular and chaotic arrangement.

Figure 8:
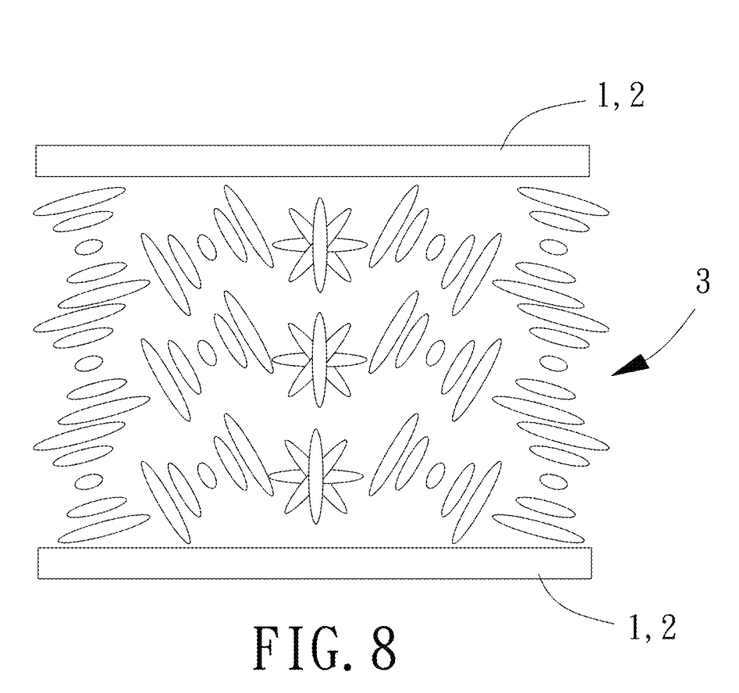
FIG. 8 is a diagram showing a uniform lying helix (ULH) structure arrangement gradually formed by liquid crystal molecules caused by applying the third alternating current voltage.

In the third step S3, the third alternating current voltage with a low magnitude and a low frequency is applied to the liquid crystal polarizing grating. The third alternating current voltage is between 8 V and 12 V, and the third frequency is between 10 Hz and 60 Hz. As shown in FIG. 8, the liquid crystal molecules gradually form the ULH structure, but some of the liquid crystal molecules are still in an arrangement under perturbation.

In the fourth step S4, the fourth alternating current voltage with a low magnitude and a high frequency is applied to the liquid crystal polarizing grating. The fourth alternating current voltage is between 8 V and 12 V, and the fourth frequency is between 1 kHz and 30 kHz. As shown in FIG. 9, the liquid crystal molecules form the ULH structure and are arranged periodically. In this way, a diffraction efficiency can be improved, and the liquid crystal polarizing grating can serve as a transmissive polarizing grating.

In addition, in the fourth step S4 in which the liquid crystal molecules are arranged in the ULH structure, the first alternating current voltage with the high magnitude and the high frequency can be applied to the liquid crystal polarizing grating, forcing the liquid crystal molecules to form a homeotropic alignment, and then the first alternating current voltage can be removed. Thus, the liquid crystal molecules can return to the planar structure as provided in the initial step.

Figure 10:
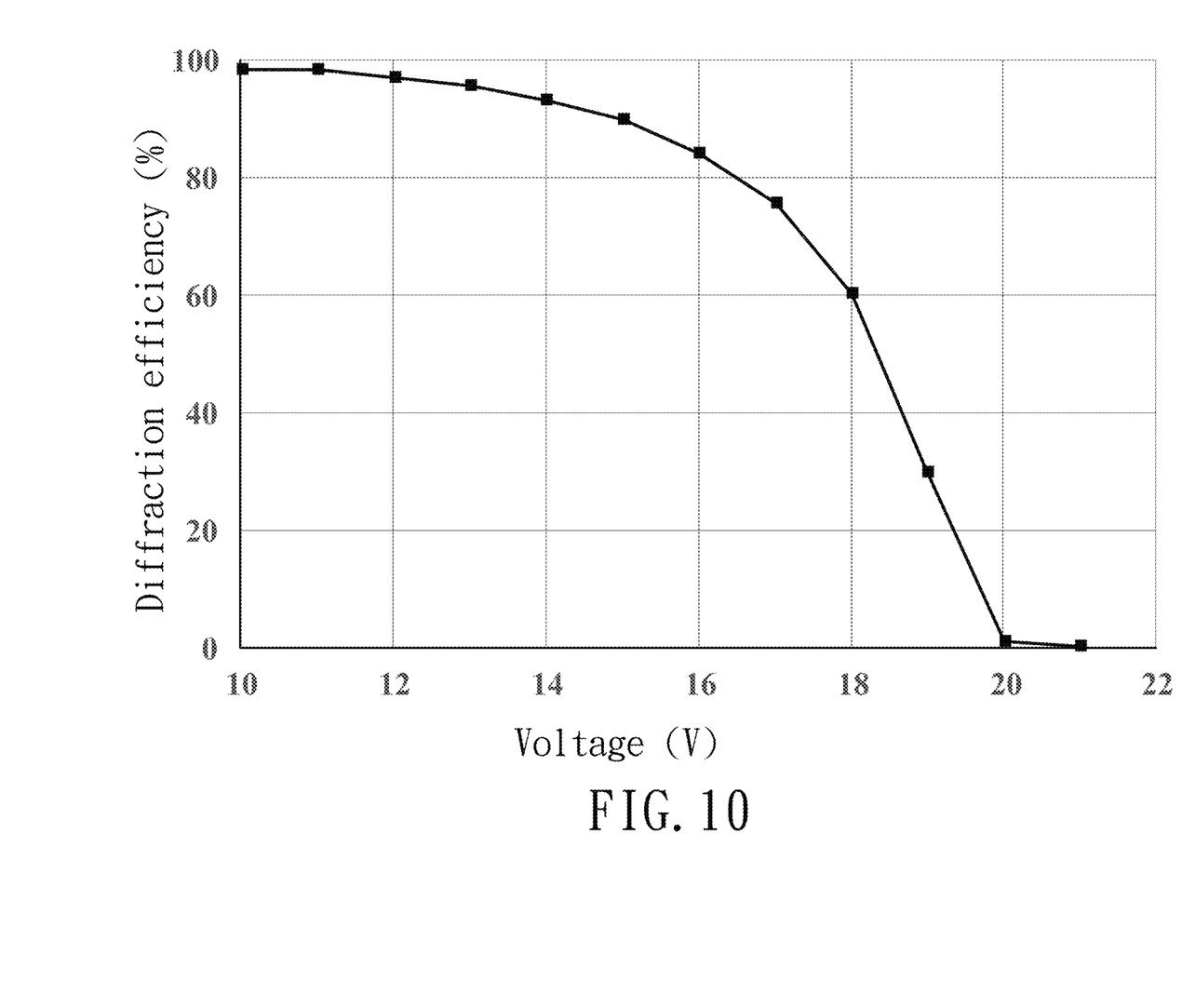
FIG. 10 is a diagram showing the relationship between a diffraction efficiency of the transmissive polarizing grating and the applied voltage in the fourth step.

FIG. 10 is a diagram showing a relationship between a diffraction efficiency of the transmissive polarizing grating and an applied voltage. In this embodiment, laser light with a wavelength of 532 nm is incident on the transmissive polarizing grating, and intensities of positive first-order diffracted light, negative first-order diffracted light, and zero-order diffracted light are measured. The diffraction efficiency is a ratio of a sum of the intensities of the positive first-order diffracted light and the negative first-order diffracted light to a sum of the intensities of the zero-order diffracted light, the positive first-order diffracted light, and the negative first-order diffracted light. It is shown in FIG. 10 that, under an applied voltage of 10 V, the transmissive polarizing grating has a highest diffraction efficiency. More specifically, the diffracted light is mainly split into positive first-order diffracted light and negative first-order diffracted light. When the applied voltage is at least 20 V, the arrangement of the liquid crystal molecules gradually straightens, resulting in a decreased diffraction efficiency of the laser light with the wavelength of 532 nm. In other words, transmitting light mainly includes zero-order diffracted light.

Figure 11:
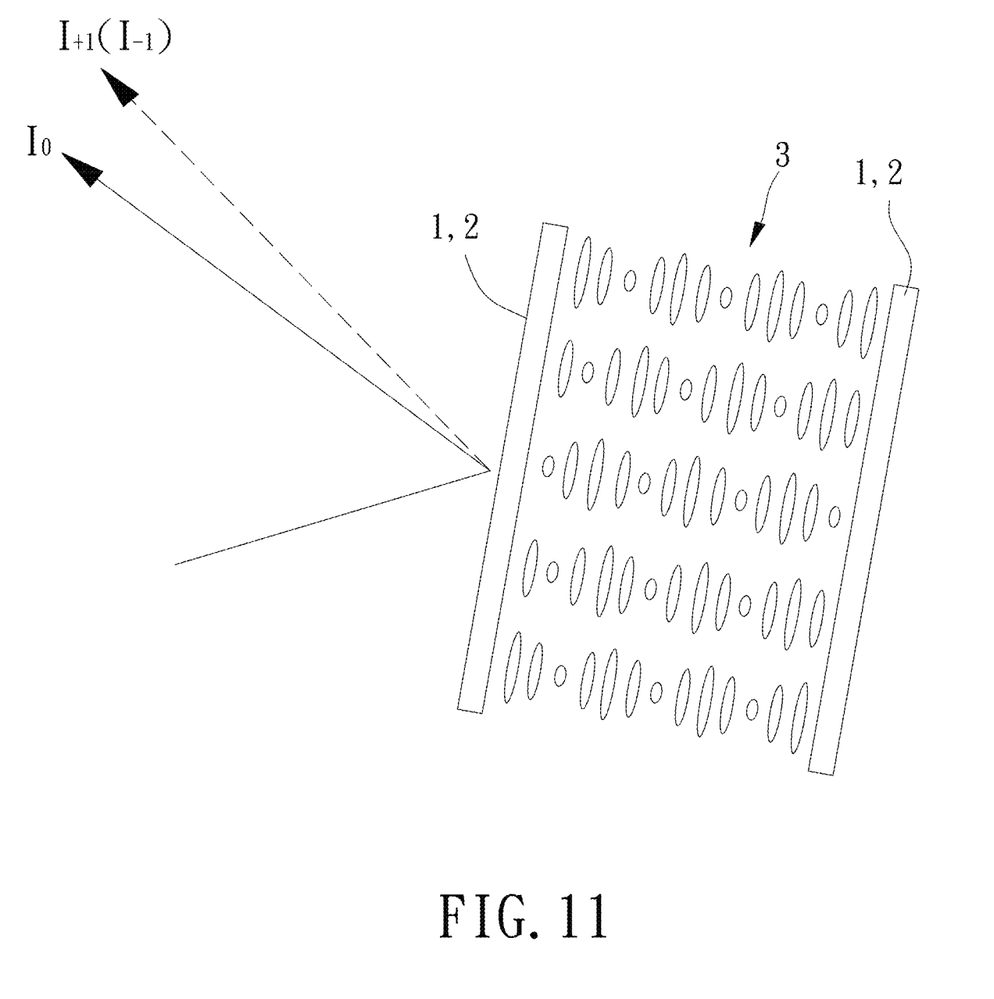
FIG. 11 is a diagram showing the diffraction of a reflective polarizing grating.

FIG. 11 shows the diffraction of light incident on a reflective polarizing grating. Since the cholesteric liquid crystals can reflect circularly polarized light in only one direction through Bragg reflection, reflected diffracted light includes zero-order light $I_0$ and only one of positive first-order light $I_{+1}$ and negative first-order light $I_{-1}$.

Figure 12:
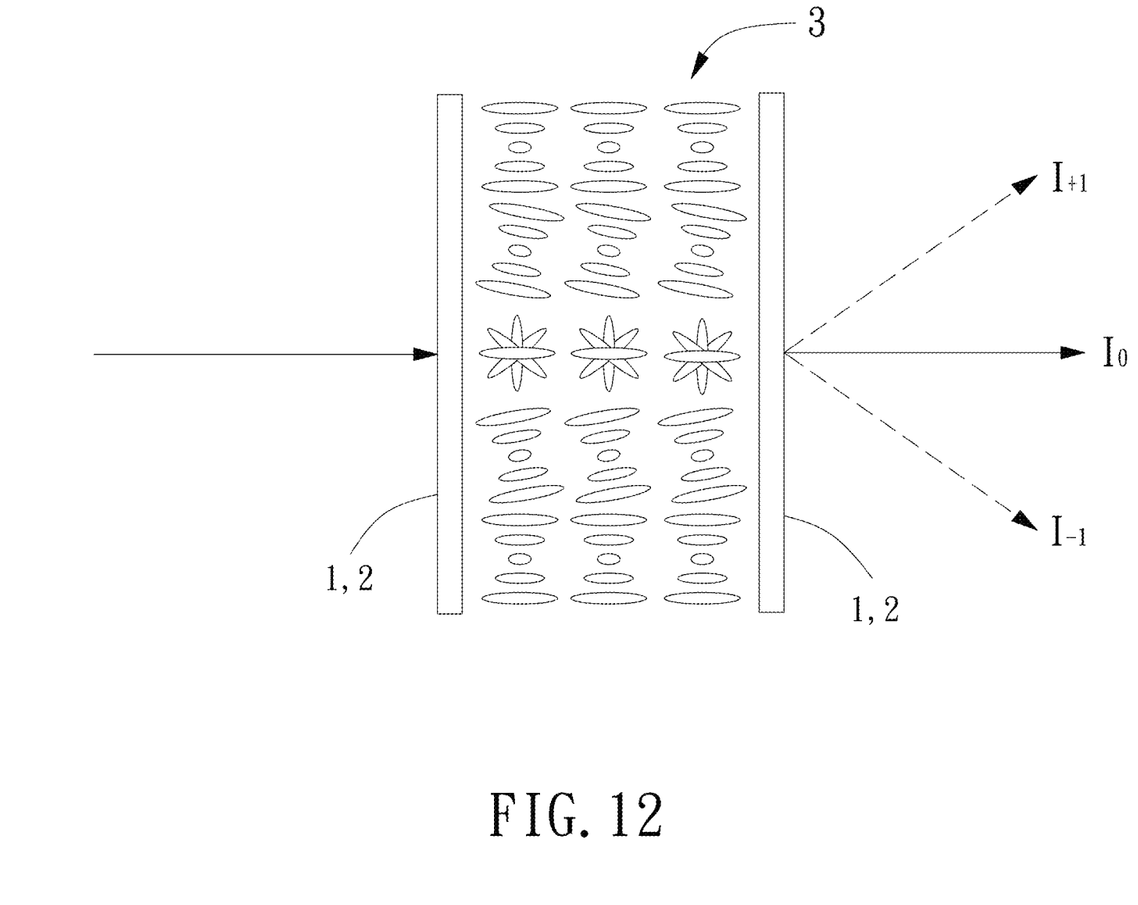
FIG. 12 is a diagram showing the diffraction of a transmissive polarizing grating.

FIG. 12 shows the diffraction of light incident on a transmissive polarizing grating. Since the transmissive polarizing grating is not polarization-selective, both left-hand and right-hand circularly polarized light are diffracted, and the transmitting diffracted light includes positive first-order light $I_{+1}$, negative first-order light $I_{-1}$, and zero-order light $I_0$.

In summary, according to the switching method for the liquid crystal polarizing grating of the present invention, the liquid crystal polarizing grating incorporates the positive cholesteric liquid crystals and the alignment films with periodic alignment directions. Through applying specific voltages and frequency changes in four stages, the liquid crystal molecules can be arranged in a complete and stable ULH structure through the EDH effect. In addition, the liquid crystal molecules can be switchable between the planar structure and the ULH structure. The planar structure and the ULH structure may respectively correspond to a reflective polarizing grating and a transmissive polarizing grating. In this way, switching between two optical operating modes can be achieved through a single optical element, thereby improving operational flexibility, saving space in an optical system, and improving the diffraction efficiency.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims. Furthermore, in a case that several of the above embodiments can be combined, the present invention includes the implementation of any combination.

What is claimed is:

1. A switching method for a liquid crystal polarizing grating, wherein the liquid crystal polarizing grating includes two substrates, two alignment films, and a cholesteric liquid crystal layer, with the two alignment films respectively located on opposite inner surfaces of the two substrates, with the cholesteric liquid crystal layer located between the two alignment films, with alignment directions of the alignment films periodically arranged based on a grating period, and with a voltage applied to the liquid crystal polarizing grating to form an alternating current electric field between the two substrates and act on the cholesteric liquid crystal layer, and wherein the switching method comprises:

an initial step, in which no voltage is applied to the liquid crystal polarizing grating, and liquid crystal molecules of the cholesteric liquid crystal layer are arranged in a planar structure;

a first step, in which a first alternating current voltage is applied to the liquid crystal polarizing grating, wherein the first alternating current voltage has a first frequency;

a second step, in which a second alternating current voltage is applied to the liquid crystal polarizing grating, wherein the second alternating current voltage has a second frequency;

a third step, in which a third alternating current voltage is applied to the liquid crystal polarizing grating, wherein the third alternating current voltage has a third frequency; and a fourth step, in which a fourth alternating current voltage is applied to the liquid crystal polarizing grating, wherein the fourth alternating current voltage has a fourth frequency, and the liquid crystal molecules of the cholesteric liquid crystal layer are arranged in a uniform lying helix structure;

wherein the first alternating current voltage is greater than the third alternating current voltage and the fourth alternating current voltage, the second alternating current voltage is greater than the third alternating current voltage and the fourth alternating current voltage, the first frequency is greater than the second frequency and the third frequency, and the fourth frequency is greater than the second frequency and the third frequency.

2. The switching method for the liquid crystal polarizing grating as claimed in claim 1, wherein each of the first alternating current voltage and the second alternating current voltage is between 30 V and 50 V.

3. The switching method for the liquid crystal polarizing grating as claimed in claim 1, wherein each of the third alternating current voltage and the fourth alternating current voltage is between 8 V and 12 V.

4. The switching method for the liquid crystal polarizing grating as claimed in claim 1, wherein each of the first frequency and the fourth frequency is between 1 kHz and 30 kHz.

5. The switching method for the liquid crystal polarizing grating as claimed in claim 1, wherein each of the second frequency and the third frequency is between 10 Hz and 60 Hz.

6. The switching method for the liquid crystal polarizing grating as claimed in claim 1, wherein in the fourth step in which the liquid crystal molecules are arranged in the uniform lying helix structure, the first alternating current voltage is applied to the liquid crystal polarizing grating and then removed, and the liquid crystal molecules are returned to the planar structure as provided in the initial step.

7. The switching method for the liquid crystal polarizing grating as claimed in claim 1, wherein a wavelength of light reflected by the cholesteric liquid crystal layer is between 400 nm and 700 nm.

8. The switching method for the liquid crystal polarizing grating as claimed in claim 1, wherein the grating period is between 200 nm and 40 μm.

* * * * *